US012035150B2

(12) United States Patent
Smoot et al.

(10) Patent No.: US 12,035,150 B2
(45) Date of Patent: *Jul. 9, 2024

(54) TECHNIQUES FOR SPATIAL DIVERSITY IN SATELLITE COMMUNICATIONS

(71) Applicant: Kymeta Corporation, Redmond, WA (US)

(72) Inventors: Maxwell A. Smoot, Seattle, WA (US); Alexander L. Bautista, Jr., Seattle, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,705

(22) Filed: Jun. 23, 2023

(65) Prior Publication Data

US 2024/0015526 A1 Jan. 11, 2024

Related U.S. Application Data

(63) Continuation of application No. 17/498,255, filed on Oct. 11, 2021, now Pat. No. 11,729,633.

(Continued)

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0617* (2013.01); *H04B 7/18582* (2013.01);
(Continued)

(58) Field of Classification Search
CPC ..... H04W 16/28; H04W 84/06; H04W 48/18; H04B 7/0617; H04B 7/18582;
(Continued)

(56) References Cited

U.S. PATENT DOCUMENTS 5,552,795 A    9/1996   Tayloe et al.
7,792,070 B1   9/2010   Burr
(Continued)

FOREIGN PATENT DOCUMENTS

KR    10-2127836 B1    6/2020

OTHER PUBLICATIONS

International Preliminary Report and Written Opinion on the Patentability of Application No. PCT/US2021/054618 Mailed Feb. 3, 2021, 8 pages.

(Continued)

*Primary Examiner* — Tejis Daya
(74) *Attorney, Agent, or Firm* — Womble Bond Dickinson (US) LLP

(57) ABSTRACT

Methods and apparatuses for communicating in a satellite communication framework with spatial diversity are described. In one embodiment, a method for controlling communication in a satellite communication network having multiple constellations and a satellite terminal with a single electronically steered flat-panel antenna capable of generating a plurality of beams for communication links with multiple satellites, comprises: determining, under network control, availability of a plurality of networks by which network traffic may be exchanged with the single electronically steered flat-panel antenna; and managing, under network control, two or more satellite links between the single electronically steered flat-panel antenna and two or more satellites of different networks to route the network traffic, including determining when to use each of the two or more (Continued)

satellite links, the two or more satellite links being generated using two or more beams from the single electronically steered flat-panel antenna.

22 Claims, 7 Drawing Sheets

Related U.S. Application Data

(60) Provisional application No. 63/090,376, filed on Oct. 12, 2020.

(51) Int. Cl.
*H04B 7/185* (2006.01)
*H04W 84/06* (2009.01)

(52) U.S. Cl.
CPC ..... *H04B 7/18589* (2013.01); *H04B 7/18591* (2013.01); *H04W 84/06* (2013.01)

(58) Field of Classification Search
CPC ............ H04B 7/18589; H04B 7/18591; H04B 7/0408; H04B 7/18517; H04B 7/06952; H04B 7/18519; H04B 7/18532
See application file for complete search history.

(56) References Cited

U.S. PATENT DOCUMENTS

| | | | |
|---|---|---|---|
| 8,457,682 | B2 | 6/2013 | Raab |
| 10,659,148 | B2 | 5/2020 | Trutna et al. |
| 11,063,661 | B2 | 7/2021 | Rothaar et al. |
| 11,542,040 | B1* | 1/2023 | Hemmati ............... H04B 7/195 |
| 2002/0081969 | A1 | 6/2002 | Chang et al. |
| 2008/0146145 | A1 | 6/2008 | Pateros et al. |
| 2015/0103723 | A1 | 4/2015 | Kim et al. |
| 2020/0244346 | A1 | 7/2020 | Goettle |
| 2020/0245210 | A1* | 7/2020 | Fotheringham ....... H04W 36/14 |
| 2022/0128708 | A1 | 4/2022 | Lee et al. |
| 2023/0091821 | A1* | 3/2023 | Smoot .................. H01Q 13/103 |
| | | | 455/12.1 |

OTHER PUBLICATIONS

International Search Report and Written Opinion received for PCT Patent Application No. PCT/US21/54618, mailed on Feb. 3, 2022, 6 pages.

* cited by examiner

Determine communication networks in a satellite communication system that are available for communication of network traffic exchanged with the single electronically steered flat-panel antenna
401

Manage two or more satellite links between the single electronically steered flat-panel antenna and two or more satellites of different networks to route the network traffic
402

FIG. 4

TECHNIQUES FOR SPATIAL DIVERSITY IN SATELLITE COMMUNICATIONS

PRIORITY

The present application is a continuation of U.S. patent application Ser. No. 17/498,255, entitled "TECHNIQUES FOR SPATIAL DIVERSITY IN SATELLITE COMMUNICATIONS", filed Oct. 11, 2021, which is a continuation of and claims the benefit of U.S. Provisional Patent Application No. 63/090,376, entitled "Techniques for Spatial Diversity in Satellite Communications", filed on Oct. 12, 2020, each of which is incorporated by reference in its entirety.

FIELD OF THE INVENTION

Embodiments of the present invention relate to the field of satellite communications; more particularly, embodiments of the present invention relate to satellite antennas that generate multiple, different beams to communicate with multiple satellites.

BACKGROUND

A satellite dish must have a line-of-sight (LOS) to the satellite in order for communication to occur. In other words, to transmit and receive data in a satellite communication system, the transmit and receive stations must be in view of each other without any blocking obstacles between them. Because a satellite communication system is a LOS communication system, satellite communication providers must accept that communication may be temporarily lost or take steps to ensure that an alternative communication path is available if the satellite connection is temporarily lost due to a loss of LOS due to some such obstructions. That is, LOS-based communication technologies are severely impacted by path blockages due to buildings, foliage, people, cars, etc. With only a single link upon which to rely, user data being transmitted in such communication system is stopped during any of these blockages. This is especially a problem in an urban scenario where blockages are frequent. In the past, satellite communication providers would include two physically distinct satellite communication antennas to provide two satellite links to be available such that if one was obstructed, the other could be used to continue communication.

More recently, some satellite antennas have multi-beam capability. For example, see, U.S. Pat. No. 11,063,661, entitled "Beam Splitting Hand Off Systems Architecture," issued Jul. 13, 2021. Such capabilities enable a satellite antenna to have multiple connections with multiple satellites at the same time.

SUMMARY

Methods and apparatuses for communicating in a satellite communication framework with spatial diversity are described. In one embodiment, a method for controlling communication in a satellite communication network having multiple constellations and a satellite terminal with a single electronically steered flat-panel antenna capable of generating a plurality of beams for communication links with multiple satellites, comprises: determining, under network control, availability of a plurality of networks by which network traffic may be exchanged with the single electronically steered flat-panel antenna; and managing, under network control, two or more satellite links between the single electronically steered flat-panel antenna and two or more satellites of different networks to route the network traffic, including determining when to use each of the two or more satellite links, the two or more satellite links being generated using two or more beams from the single electronically steered flat-panel antenna.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a flow diagram of some embodiments of a process for controlling communication in a satellite communication network having multiple constellations and a satellite terminal with a single electronically steered flat-panel antenna capable of generating a plurality of beams for communication links with multiple satellites.

DETAILED DESCRIPTION

Figure 1:
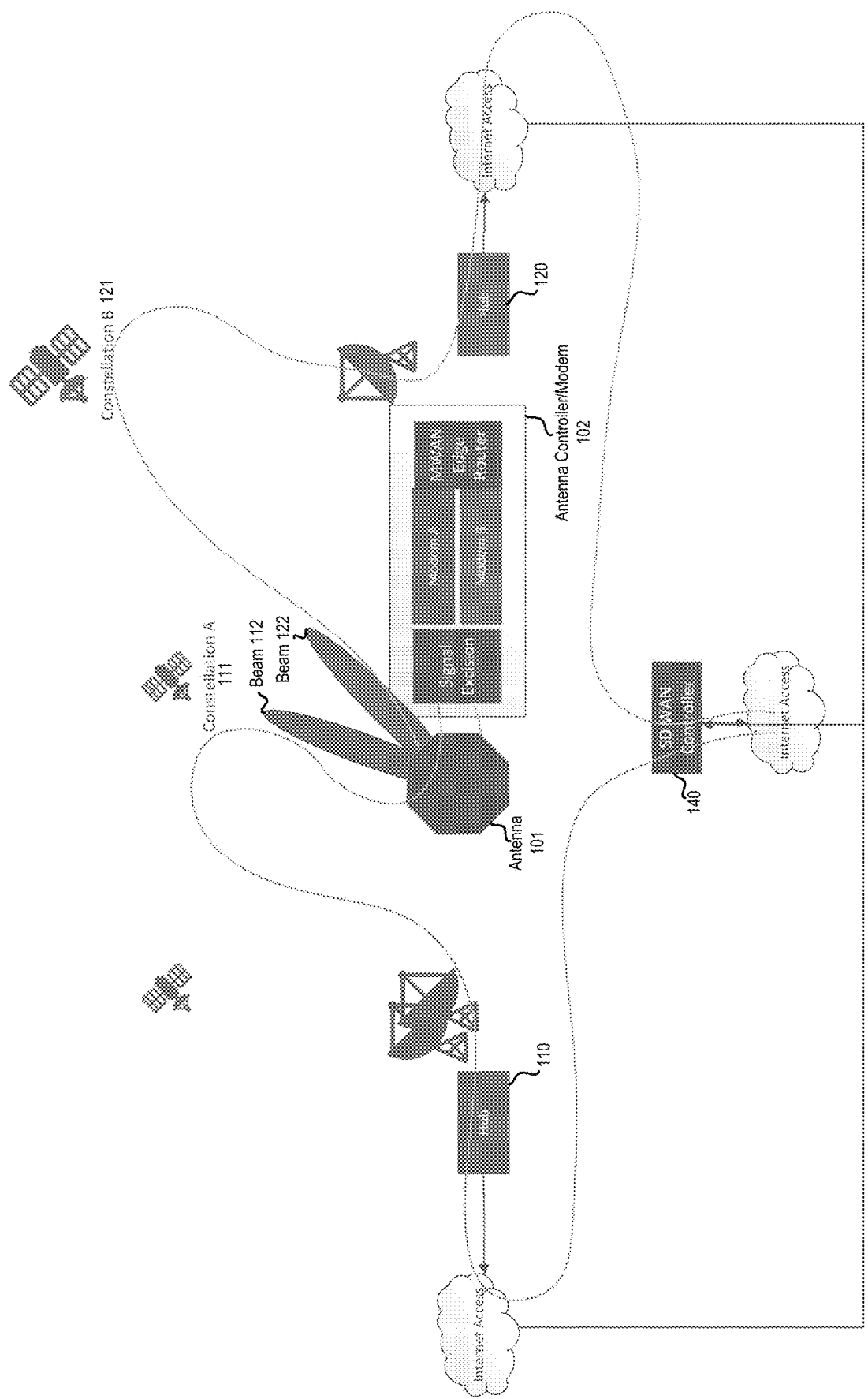
FIG. 1 illustrates an uncoordinated path with balanced independent beams.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments disclosed herein use multi-beam technology for a satellite antenna to communication with more than one network. This enables the satellite antenna to have and use concurrent active links on multiple satellites. In some embodiments, these antennas are part of satellite terminals. By leveraging such multi-beam capabilities with the antennas of satellite terminals in some embodiments, such terminals are able to produce multiple beams simultaneously or with near-instantaneous switching speeds, thereby enabling a network to route traffic for high reliability connections in mobility scenarios where line-of-sight technologies would otherwise be randomly and frequently disrupted by buildings, people, cars, foliage, etc. The techniques disclosed herein overcome these deficiencies.

In some embodiments, the satellite terminals use antennas with multi-beam capabilities that include a metasurface that is a multi-functional and tunable radiating aperture composed of thousands of subwavelength radiating elements. In some embodiments, these radiating antenna elements are individually and dynamically controlled through software, which enables the metasurface to rapidly adapt radiation characteristics required to form a beam, steer the beam direction, and change its frequency and polarization at the same time. In a dual-beam scenario, the metasurface serves both beams with dual-beam modulation algorithms. In some embodiments, the satellite terminals use antennas and antenna elements such as described in U.S. Pat. No. 10,892,553, "Broad Tunable bandwidth Radial Line Slot Antenna," issued Jan. 12, 2021, and/or U.S. Pat. No. 11,063,661, entitled "Beam Splitting Hand Off Systems Architecture," issued Jul. 13, 2021.

In some embodiments, the multi-beam technology may be used to provide the concurrent active satellite links in either an uncoordinated scenario or coordinated scenario. These scenarios are described in more detail below.

In an uncoordinated scenario, a user terminal uses its antenna to maintain links to two networks independently. In some embodiments, the user terminal maintains the links to two networks independently through a coordinated effort between a local multi-wide area network (MWAN) router, multi-beam aperture and a processor, such as, but not limited to, a digital signal processor (DSP). In some embodiments, the DSP performs a signal excision.

In some embodiments, when providing two concurrent beams, the antenna creates the beams and weights them based on one or more of goals. In some embodiment, the weighting of beams depends on a cost function. Examples of weighting that are employed in some embodiments includes, but is not limited to, the following:

In a balanced case, the terminal would try to maximize spectral efficiency on each;

In a strongly biased weighting, the terminal may opt to maximize spectral efficiency on a primary beam and reduce a secondary beam (or set of beams) to a level sufficient only to sustain a connection to the secondary satellite network; and In a mixed case, the terminal may weight the beams based off performance to maximize throughput or minimize the cost of data transferred.

FIG. 1 illustrates a satellite communication system topology with an uncoordinated path with balanced independent beams. Referring to FIG. 1, antenna 101 is able to receive and transmit network traffic, or otherwise communicate, with two networks. In some embodiments, antenna 101 uses a split beam approach such as described in U.S. Pat. No. 11,063,661, entitled "Beam Splitting Hand Off Systems Architecture," issued Jul. 13, 2021. Using the split beam approach, antenna 101 controls each beam independently and each feeds into independent receive and transmit paths, resulting in a single physical terminal acting as two independent terminals.

A first network includes hub 110 and communication occurs via constellation A 111 using beam 112, while a second network includes hub 120 and communication occurs via constellation B 121 using beam 122. Hubs 110 and 120 send and receive the network traffic of antenna 101 with SDWAN controller 140. In some embodiments, these communication paths provide network access (e.g., Internet access) to a computing system employing antenna 101. In some embodiments, antenna 101 is a single electronically steered flat-panel antenna capable of generating a plurality of beams for satellite communication links. Note that the techniques disclosed herein are not limited to having an antenna only communicate with two networks; in alternative embodiments, antenna 101 is able to generate beams for communication with more than two satellites.

In some embodiments, antenna 101 is part of a satellite terminal that includes an antenna controller/modem 102. In some embodiments, controller 102 includes modems A and B for use in communicating with hub 110 via satellite 111 using beam 112 and communicating with hub 120 via satellite 121 using beam 122, respectively. Controller 102 also includes a MWAN edge router and a signal excision unit.

When using a split beam approach, in some embodiments, advanced signal processing and multi-WAN routing are used to enable multibeam operation across uncoordinated networks. In some embodiments, the independent dual beam architectures do require independent RF chains to operate without any coordination across the networks. This is consistent with a commonly referenced limit that the maximum number of simultaneous data streams is less than or equal to the number of RF chains available on the terminal.

In some embodiments, in the uncoordinated scenario, a MWAN edge router of controller 102 and SDWAN controller 140 route traffic over each link according to a set of business rules. In the situation in which the beams generated by antenna 101 are weighted in a strongly biased weighting manner as described above, the MWAN edge router of controller 102 and SDWAN controller 140 work in concert to maintain a network connection (keep-alive) on the secondary networks (associated with the secondary links and beams of antenna 101) for protected failover during line-of-site (LOS) blockages or other outage events. In some embodiments, the MWAN edge router is used by the user's terminal to divide outgoing traffic according to the business rules that have been set while SDWAN controller 140 does the same with respect to the user terminal's incoming traffic. In some embodiments, SDWAN controller 140 includes the set of functions that determines the business rules, and the MWAN edge router implements those rules. In some embodiments, SDWAN controller 140 includes information on both the outgoing and incoming traffic paths performs coordination between the MWAN edge router from that point.

In some embodiments, the signal excision unit of controller 102 reduces the coordination burden through increased isolation between two co-channel downlink carriers. More specifically, the signal excision unit performs signal processing in a manner well-known in the art to isolate two (or more) carriers from one another, primarily for signal quality and/or data integrity purposes (e.g., extract data from multiple satellite received on the same signals, etc.).

Figure 2:
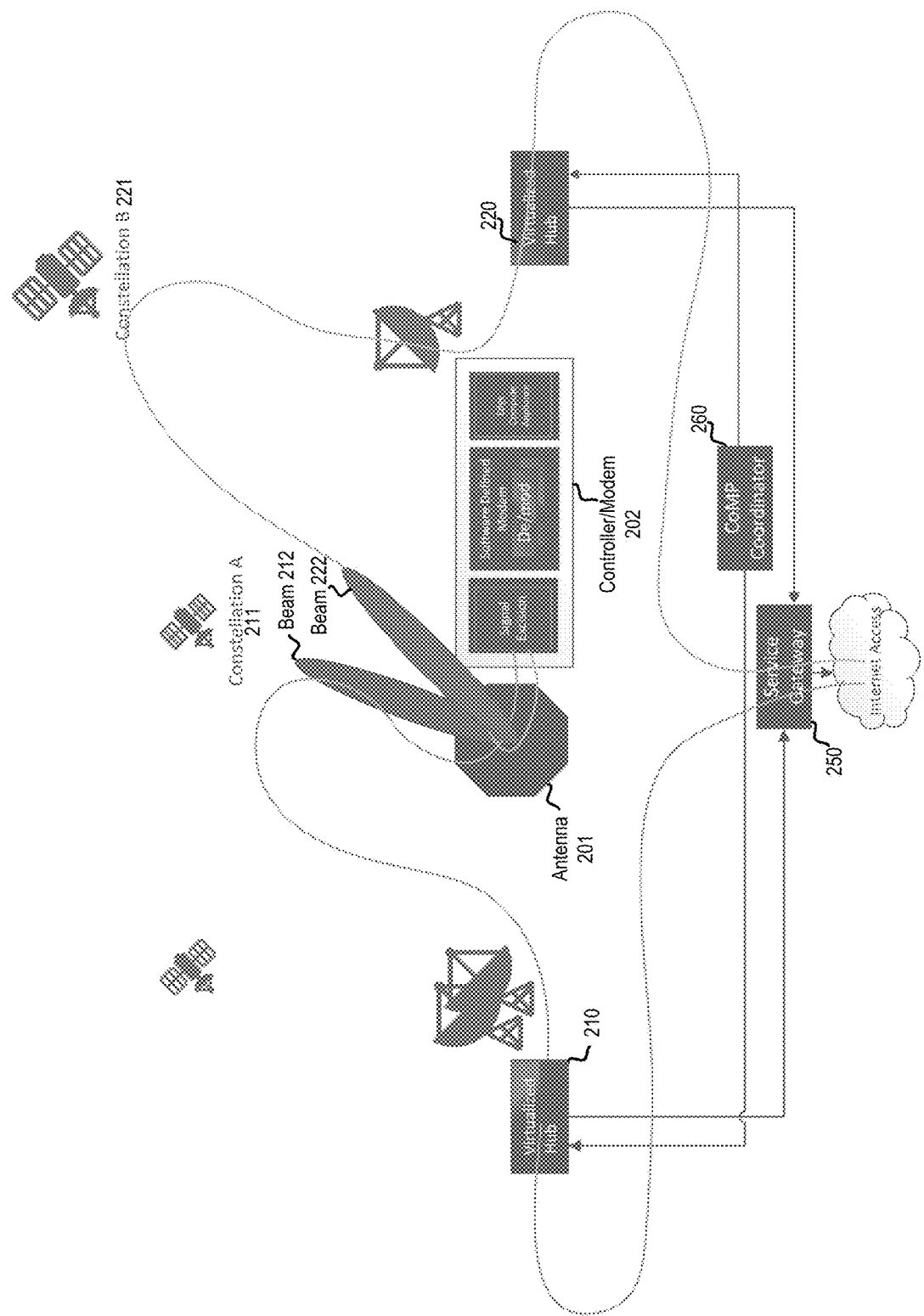
FIG. 2 illustrates an uncoordinated path with weighted independent beams.

The uncoordinated approaches described above may be improved with additional integration of the terminal-side modems and virtualization or standardization on the hubs. FIG. 2 illustrates a satellite communication system topology with an uncoordinated path with weighted independent beams and virtualized hubs/modems.

Referring to FIG. 2, antenna 201 is able to receive and transmit network traffic, or otherwise communicate, with two networks. A first network includes virtualized hub (hub) 210 and communication occurs via constellation A 211 using beam 212, while a second network includes virtualized hub (hub) 220 and communication occurs via constellation B 221 using beam 222. Hubs 210 and 220 send and receive the network traffic of antenna 201 with service gateway 250. In some embodiments, these communication paths provide network access (e.g., Internet access) to a computing system employing antenna 201. In some embodiments, antenna 201 is a single electronically steered flat-panel antenna capable of generating a plurality of beams for satellite communication links. Note that the techniques disclosed herein are not limited to having an antenna only communicate with two networks; in alternative embodiments, antenna 201 is able to generate beams for communication with more than two satellites.

In some embodiments, antenna 201 is part of a satellite terminal that includes an antenna controller/modem 202. In some embodiments, controller 202 includes soft modems for use in communications with hub 210 via satellite 211 using beam 212 and communications with hub 220 via satellite 221 using beam 222, respectively. Controller 202 also includes an edge compute appliance and a signal excision unit.

More specifically, in some embodiments, antenna 201 creates two independent beams weighted per the use case. In some embodiments, the use of software defined (soft) modems of controller 202 increases, and potentially maximizes, the terminal flexibility to join new networks while reducing, and potentially minimizing, the size and weight of the user terminal. More specifically, the soft modems of controller 202, in addition to having modulator/demodulators and associated encoders/decoders, include routing functionality and logic to coordinate with the hub. In some embodiments, the soft modem is able to expand the routing ruleset and coordination aspect to consider both links associated with the two beams. When considering an ATDMA return link scenario, there is a time plan associated with each link in which each terminal knows when it can transmit within the next sequence of bursts. In such a case, the soft modem could either coordinate with each hub to apply "keep out timing" on each plan or it could selectively prioritize traffic on link A over link B due to demand/business rules. In this case, that would likely mean opting to not transmit anything on link B during the overlapped time slots.

In some embodiments, even though the soft modems of controller 202 join new networks, there is no coordination between the networks themselves. In other words, hub 210 and hub 220 do not work together to route the network traffic between antenna 201 and service gateway 250.

Virtualized hubs 210 and 220 increase the access to new constellations by reducing integration time and increasing the cross-constellation coordination. In some embodiments, a Coordinated Multi-point (CoMP) coordinator 260 is communicably coupled to virtualized hubs 210 and 220 for load balancing. For example, CoMP coordinator 260 load balances across the available satellite links for robust failovers and advanced network management in a manner well-known in the art.

In some embodiments, the edge compute appliance of controller 202 orchestrates virtualized network functions, including network node functions related to, for example, but not limited to, receiving, sending, creating, or storing data, including providing some form of identification to receive access, and may include other network functions such as, but not limited to, functions such as load balancing, firewall and, intrusion detection and WAN acceleration.

Fast switching is an alternative multi-beam approach that uses the rapid beamforming capabilities of the terminal to maintain active links by repointing from one satellite to another as data is available on each. By pointing a single beam at a time, the antenna negates any gain or co-frequency interference penalties due to forming multiple beams simultaneously. Therefore, the terminal maintains the maximum signal quality available for each beam during data transmission. Fast switching is not subject to the same cost and power impacts as discussed in the independent dual beam scenario as only one beam is used at any time.

In some embodiments, with the combination of fast switching and soft modems/virtualized hubs, the satellite terminal having an antenna with multi-beam capability complements agile network management to increase quality of service (QoS) and/or one or more network efficiency goals. In some embodiments, this is accomplished where the antenna coordinates beamforming with the modem for physical routing. In some embodiments, this is down to the lowest time block (time slice, subframe, frame, packet, etc.), with each link operating at its maximum spectral efficiency, and single beam-fast switching minimizes user terminal Size Weight and Power-Cost (SWAP-c).

Figure 3:
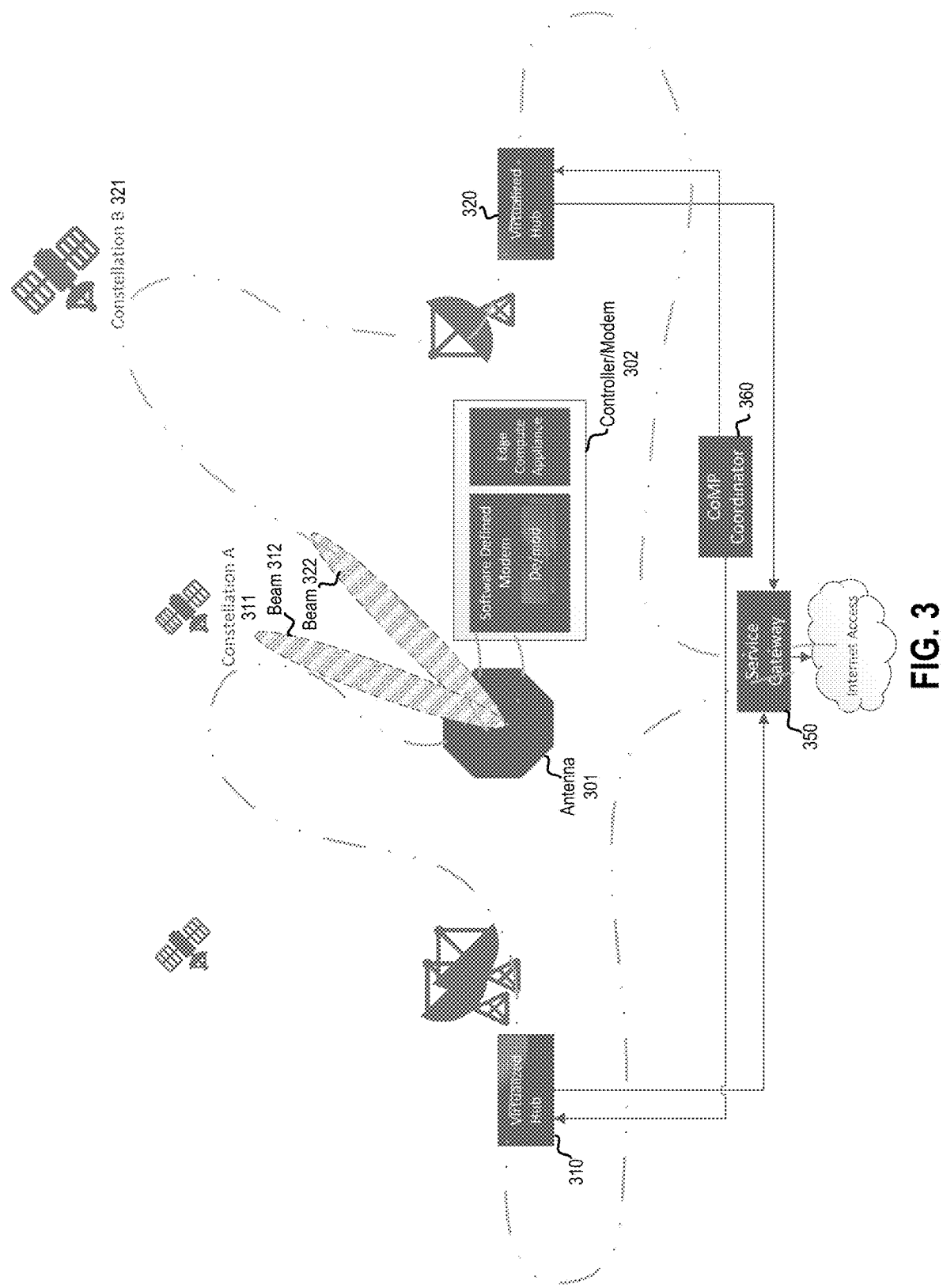
FIG. 3 illustrates a coordinated path with switching of independent beams.

In some embodiments, the coordinated paths may be combined for repointing on multiple beams simultaneously. FIG. 3 illustrates a coordinated path with dynamic repointing where only one beam is generated by the satellite terminal antenna at a time (indicated by dashed lines) but with fast switching between beams that are used to route traffic from the satellite terminal antenna and a service gateway to the Internet or other network.

Referring to FIG. 3, antenna 301 is able to receive and transmit network traffic, or otherwise communicate, with two networks. A first network includes virtualized hub/eNB 310 and communication occurs via constellation A 311 using beam 312, while a second network includes virtualized hub/eNB 320 and communication occurs via constellation B 321 using beam 322. Virtualized hub/eNB 310 and 320 send and receive the network traffic of antenna 301 with service gateway 350. In some embodiments, these communication paths provide network access (e.g., Internet access) to a computing system employing antenna 301. In some embodiments, antenna 301 is a single electronically steered flat-panel antenna capable of generating a plurality of beams for satellite communication links. Note that the techniques disclosed herein are not limited to having an antenna only communicate with two networks; in alternative embodiments, antenna 301 is able to generate distinct beams for communication with more than two satellites.

In some embodiments, antenna 301 is part of a satellite terminal that includes an antenna controller/modem 302. In some embodiments, controller 302 includes soft modems for use in communications with hub 310 via satellite 311 using beam 312 and communications with hub 320 via satellite 321 using beam 322, respectively. In some embodiments, in a coordinated case, a fast switching terminal uses hub-side coordination to schedule windows for data transmission across the available links, with the soft modems working with hubs 310 and 320 to route the traffic. In some embodiments, CoMP controller 360 acts as this coordinator and scheduler, with virtualized hubs 310 and 320 acting as a path for enabling the coordination needed. For example, in some embodiments, each hub indicates the time slots available to antenna 301 during which its constellation is pointing to antenna 301. The modem in conjunction with antenna 301 uses these time slots to send and/or received bursts of network data with the hub via its constellation.

Controller 302 also includes an edge compute appliance that orchestrates virtualized network functions. In some embodiments, these are the same functions as discussed above in conjunction with FIG. 2.

Figure 7:
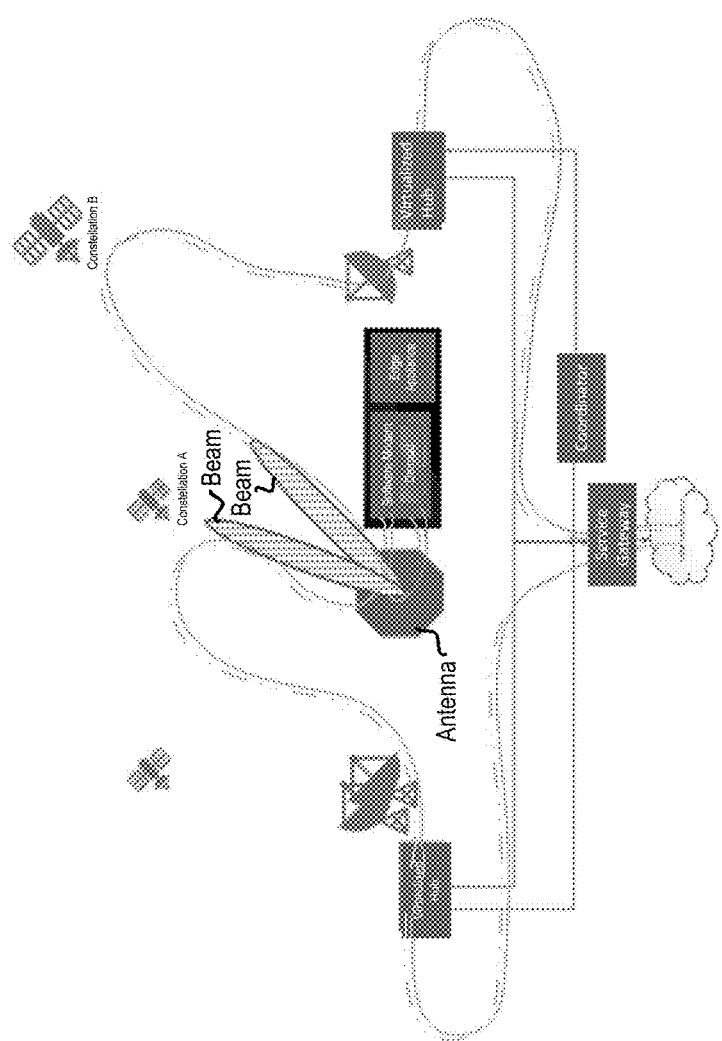
FIG. 7 illustrates some embodiments that use a split beam implementation on the downlink (receive) and a beam switching implementation on uplink (transmit).

In some embodiments, the multi-beam technology is used in a hybrid communication system in which an antenna of a network terminal performs both split beam and fast switching for beam generation. For example, in some embodiments, an antenna uses a split beam approach for receiving data while using fast switching between beams for transmit. In some embodiments, the satellite terminal can apply a split beam implementation on the downlink (receive) and a beam switching implementation on uplink (transmit). This approach is shown in FIG. 7.

Thus, embodiments are described herein that provide one or more of spatial diversity, (which increases link robustness especially in mobility scenarios, where LOS may be occluded randomly), application to mobile satellite communication for link reliability, the ability to operate on independent networks without coordination, the negation of an impact to user data with coordination, and the increase of network management flexibility for real-time load balancing across different satellites.

FIG. 4 is a flow diagram of some embodiments of a process for controlling communication in a satellite communication network having multiple constellations and a satellite terminal with a single electronically steered flat-panel antenna capable of generating a plurality of beams for communication links with multiple satellites.

Referring to FIG. 4, the processing begins by processing logic determining communication networks in a satellite communication system that are available for communication of network traffic exchanged with the single electronically steered flat-panel antenna (processing block 401). In some embodiments, each of the communication networks includes at least one hub and at least one satellite with which the single electronically steered flat-panel antenna is able to communicate. In such a case, the single electronically steered flat-panel antenna generates a beam as part of a link to the satellite to communicate with a hub in the network. In some embodiments, this determination of availability is made by network control logic. In one embodiment, the network control logic comprises a CoMP coordinator that coordinates the routing of network traffic. The CoMP coordinator may use one or more known methods of traffic determination and routing based on that determination in order to perform the network control.

After determining availability of the networks, processing logic manages two or more satellite links between the single electronically steered flat-panel antenna and two or more satellites of different networks to route the network traffic (processing block 402). In some embodiments, this is performed by network control logic. In some embodiments, the management of the satellite links includes determining when to use each of the satellite links, which are each generated using a beam from the single electronically steered flat-panel antenna.

In some embodiments, the multi-beam approach described in FIG. 4 is implemented with beam splitting. In such a case, the single electronically steered flat-panel antenna generate the two or more beams simultaneously and maintains the two or more links for communication between the single electronically steered flat-panel antenna and two or more different satellites at the same time. In some embodiments, the antenna communicates the network traffic with a first satellite using one of the concurrently generated beams while keeping a network connection to a second satellite alive with another beam. If a LOS blockage or other outage occurs with respect to the first satellite, the network traffic can be routed over the second satellite using the second beam for which a connection already exists. This may be performed without the user of the flat-panel antenna knowing that a switch between the two satellites has occurred.

Figure 5:
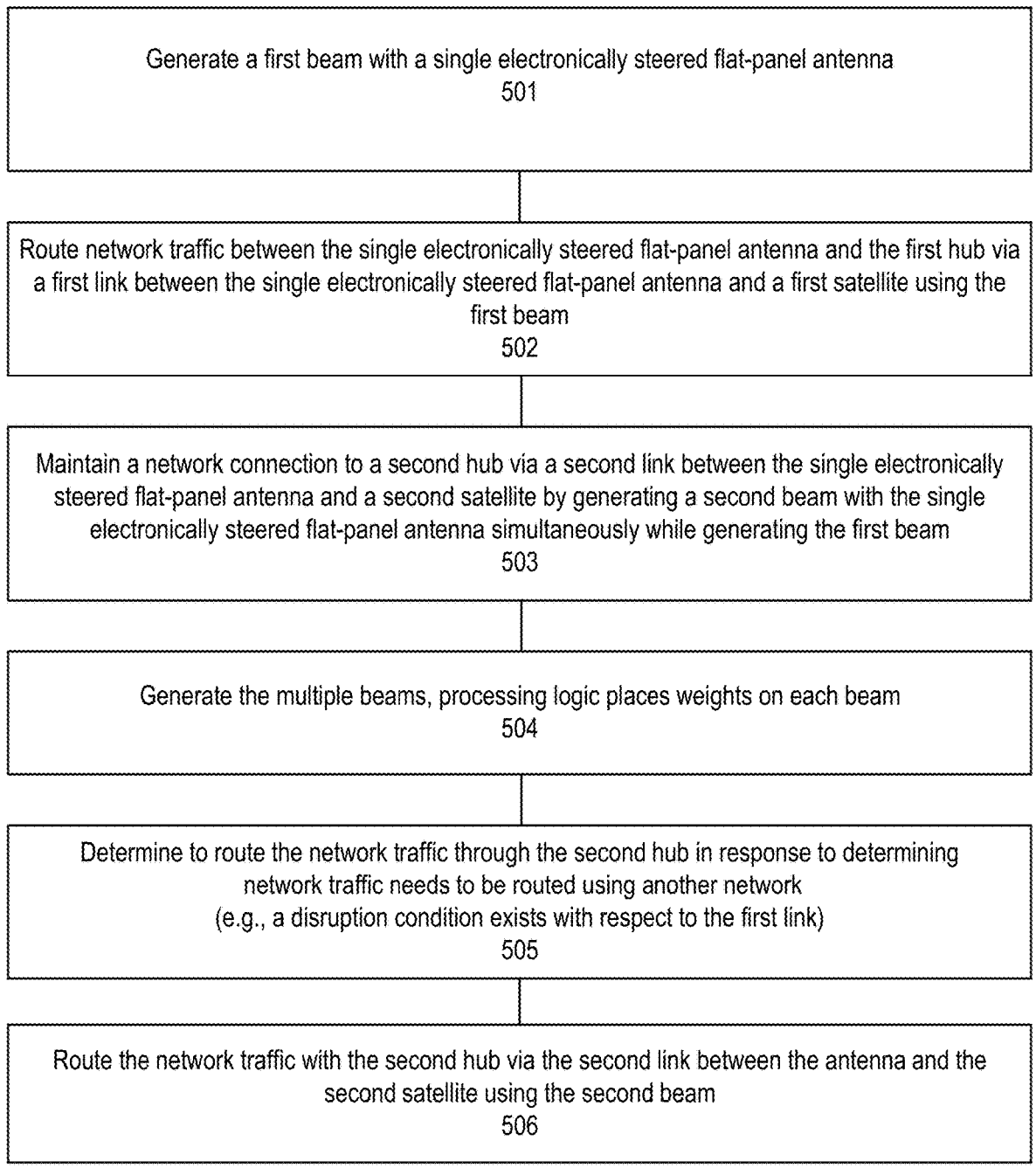
FIG. 5 is a flow diagram of some embodiments of a process for communicating network traffic between a single electronically steered flat-panel antenna and multiple networks using a split beam implementation.

FIG. 5 is a flow diagram of some embodiments of a process for communicating network traffic between a single electronically steered flat-panel antenna and multiple networks. In some embodiments, this process used to implement managing two or more satellite links between the single electronically steered flat-panel antenna and two or more satellites of different networks to route the network traffic using beam splitting.

Referring to FIG. 5, the process begins generating a first beam with a single electronically steered flat-panel antenna (processing block 501) and routing network traffic between the single electronically steered flat-panel antenna and the first hub via a first link between the single electronically steered flat-panel antenna and a first satellite using the first beam (processing block 502).

While this is occurring, the single electronically steered flat-panel antenna maintains a network connection to a second hub via a second link between the single electronically steered flat-panel antenna and a second satellite by generating a second beam with the single electronically steered flat-panel antenna simultaneously while generating the first beam (processing block 503). The second hub is different than the first hub and the second beam is different than the first beam.

In some embodiments, a multi-wide area network (MWAN) edge router associated with the single electronically steered flat-panel antenna and a software-defined wide area network (SDWAN) controller work together to maintain a network connection on secondary networks for protected fail over during LOS blockages or other outages (e.g., the primary link is overly congested or becomes unstable due to interference or low SNR (like in a high scan scenario)). As discussed above, in some embodiments, the network control includes an MWAN edge router of user terminal to divide outgoing traffic according to the business rules that have been set while a SDWAN controller does the same with respect to the user terminal's incoming traffic, and each routes the outgoing traffic in their ends of the link (and combine the incoming traffic back together) according to business rules. In this scenario, each would be routing the user traffic over the primary link but would be sending a periodic burst over the secondary link to keep that connection alive.

In some embodiments, when generating the multiple beams, processing logic places weights on each beam (processing block 504). In some embodiments, the weighting of each of the beams is based on one or more network functions. In some embodiments, weighting each of the two or more beams based on one or more network functions comprises weighting a primary beam more strongly to increase spectral efficiency while reducing weighting on one or more secondary beams to a level sufficient only to sustain a connection to a secondary satellite network. In some embodiments, weighting each of the beams based on one or more network functions comprises weighting beams based on throughput performance or reduced cost of data transfer.

The process then continues with determining to route the network traffic through the second hub in response to determining network traffic needs to be routed using another network (e.g., a disruption condition exists with respect to the first link) (processing block 505). In some embodiments, this determination is made by network control logic. In some embodiments, the disruption condition relates to a line-of-sight (LOS) disruption or another outage condition related to the first link. The LOS disruption or other outage condition may be predicted to occur in the future, known to occur in the future or has already occurred.

In response to determining the disruption condition exists, the process routes the network traffic with the second hub via the second link between the antenna and the second satellite using the second beam (processing block 506). In some embodiments, the routing occurs under the control of an MWAN edge router and/or virtualized network functions on an edge compute appliance, with a control plane providing control of which traffic path to use and the data plane handling the actual flow of the data.

In some embodiments, the multi-beam approach described in FIG. 4 is implemented with fast switching. In such a case, in some embodiments, the single electronically steered flat-panel antenna generates only one beam at a time and this beam is used exchange traffic with a first hub via a link to a first satellite. If a LOS blockage or other outage occurs with respect to the first satellite, the single electronically steered flat-panel antenna generates only one beam for a satellite link to a second, different satellite for communication with a second hub. Then the network traffic can be routed over the second satellite using the second beam for which a connection already exists. This may be performed without the user of the flat-panel antenna knowing that a switch between the two satellites has occurred.

Figure 6:
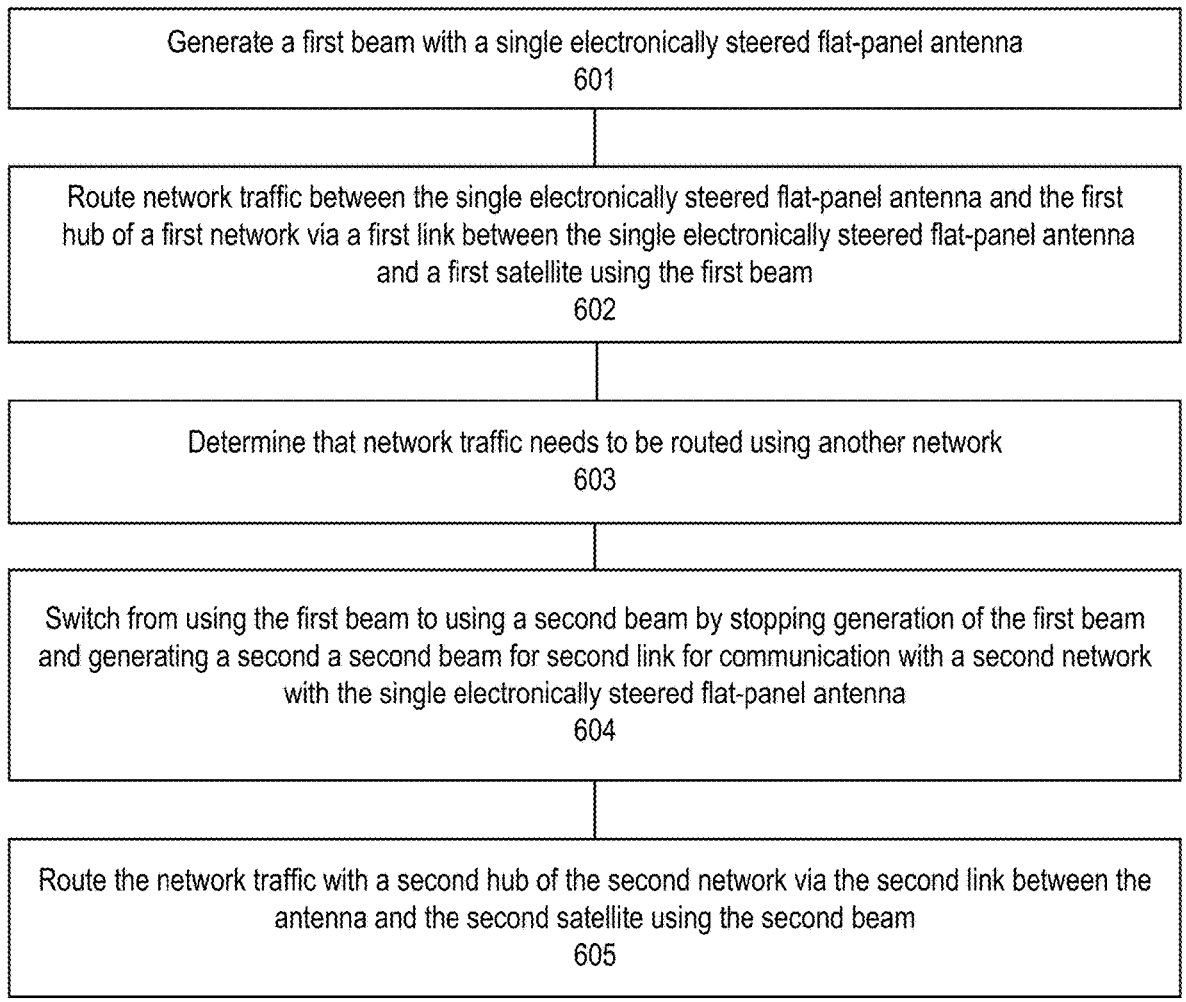
FIG. 6 is a flow diagram of some embodiments of a process for communicating network traffic between a single electronically steered flat-panel antenna and multiple networks using beam switching.

FIG. 6 is a flow diagram of some embodiments of a process for communicating network traffic between a single electronically steered flat-panel antenna and multiple networks. In some embodiments, this process used to implement managing two or more satellite links between the single electronically steered flat-panel antenna and two or more satellites of different networks to route the network traffic using only one beam at a time and switching between beams, and thus satellites.

Referring to FIG. 6, the process begins by generating a first beam with a single electronically steered flat-panel antenna (processing block 601) and routing network traffic between the single electronically steered flat-panel antenna and the first hub of a first network via a first link between the single electronically steered flat-panel antenna and a first satellite using the first beam (processing block 602).

While routing the network traffic using the first satellite, the process determines that network traffic needs to be routed using another network (processing block 603). In some embodiments, this may occur because a disruption condition exists with respect to the first link. In some embodiments, this determination is made by network control logic in the same manner as described above. In some embodiments, the disruption condition relates to a line-of-sight (LOS) disruption or another outage condition related to the first link. The LOS disruption or other outage condition may be predicted to occur in the future, known to occur in the future or has already occurred.

In response to determining the disruption condition exits, the process switches from using the first beam to using a second beam by stopping generation of the first beam and generating a second a second beam for second link for communication with a second network with the single electronically steered flat-panel antenna (processing block 604). Thereafter, the process routes the network traffic with a second hub of the second network via the second link between the antenna and the second satellite using the second beam (processing block 605). In some embodiments, this occurs in the same manner as described in FIG. 5 using the control and data planes with an MWAN edge router and/or virtualized network functions on an edge compute appliance.

In some embodiments, the single electronically steered flat-panel antenna is part of a satellite terminal having an edge compute appliance and a soft modem, and further comprising directing, by the edge compute appliance, the soft modem to switch between the two or more links to communicate the network traffic between the single electronically steered flat-panel antenna and the two or more different satellites. In some embodiments, the edge compute appliance directs the soft modem to switch between the two or more links to improve quality of service (QOS) and/or one or more network efficiency goals.

Note that the single electronically steered flat-panel antenna may switch back to using the first beam or a beam other than the second beam to route the network traffic using multi-beams and multiple satellites of different networks. In this way, the single electronically steered flat-panel antenna toggles between use of two or more beams generated by the single electronically steered flat-panel antenna for two or more satellite links.

There are a number of example embodiments described herein.

Example 1 is a method for controlling communication in a satellite communication network having multiple constellations and a satellite terminal with a single electronically steered flat-panel antenna capable of generating a plurality of beams for communication links with multiple satellites, where the method comprises: determining, under network control, availability of a plurality of networks by which network traffic may be exchanged with the single electronically steered flat-panel antenna; and managing, under network control, two or more satellite links between the single electronically steered flat-panel antenna and two or more satellites of different networks to route the network traffic, including determining when to use each of the two or more satellite links, the two or more satellite links being generated using two or more beams from the single electronically steered flat-panel antenna.

Example 2 is the method of example 1 that may optionally include generating the two or more beams simultaneously by beam splitting to maintain the two or more links for communication between the single electronically steered flat-panel antenna and two or more different satellites at the same time.

Example 3 is the method of example 2 that may optionally include: generating a first beam with a single electronically steered flat-panel antenna; routing network traffic with the first hub via a first link between the antenna and a first satellite using the first beam; maintaining a network connection to a second hub via a second link between the antenna and a second satellite by generating a second beam with the single electronically steered flat-panel antenna simultaneously while generating the first beam, the second hub being different than the first hub and the second beam being different than the first beam; determining, by the network control, to route the network traffic through the second hub in response to determining a disruption condition exists with respect to the first link; and routing the network traffic with the second hub via the second link between the antenna and the second satellite using the second beam.

Example 4 is the method of example 3 that may optionally include that the disruption condition relates to a line-of-sight (LOS) disruption or another outage condition related to the first link.

Example 5 is the method of example 2 that may optionally include weighting each of the two or more beams based on one or more network functions.

Example 6 is the method of example 5 that may optionally include that weighting each of the two or more beams based on one or more network functions comprises weighting a primary beam more strongly to increase spectral efficiency while reducing weighting on one or more secondary beams to a level sufficient only to sustain a connection to a secondary satellite network.

Example 7 is the method of example 5 that may optionally include that weighting each of the two or more beams based on one or more network functions comprises weighting beams based on throughput performance or a reduced cost of data transfer.

Example 8 is the method of example 2 that may optionally include that a multi-wide area network (MWAN) edge router associated with the single electronically steered flat-panel antenna and a software-defined wide area network (SD-WAN) controller work together to maintain a network connection on secondary networks for protected fail over during LOS blockages or other outages.

Example 9 is the method of example 1 that may optionally include that the two or more beams are generated one at a time, and wherein managing the two or more satellite links comprises switching between the two or more links to communicate the network traffic between the single electronically steered flat-panel antenna and the two or more different satellites while toggling between use of two or more beams generated by the single electronically steered flat-panel antenna for the two or more satellite links.

Example 10 is the method of example 9 that may optionally include that the single electronically steered flat-panel antenna is part of a satellite terminal having an edge compute appliance and a software-defined modem, and further comprising directing, by the edge compute appliance, the software-defined modem to switch between the two or more links to communicate the network traffic between the single electronically steered flat-panel antenna and the two or more different satellites.

Example 11 is the method of example 10 that may optionally include that the edge compute appliance directs the software-defined modem to switch between the two or more links to improve quality of service (QOS) and/or one or more network efficiency goals.

Example 12 is a satellite communication network topology comprising: a single electronically steered flat-panel antenna capable of generating a plurality of beams; a first network comprising a first hub and a first satellite; a second network comprising a second hub and a second satellite; and network control to determine availability of a first and second networks for exchanging network traffic with the single electronically steered flat-panel antenna; and manage first and second satellite links between the single electronically steered flat-panel antenna and the first and second satellites, respectively, to route the network traffic, wherein the network control is configured to determine when to use the first and second satellite links to first and second satellites, respectively, the first and second satellite links being generated using first and second beams of the plurality of beams from the single electronically steered flat-panel antenna.

Example 13 is the satellite communication network topology of example 12 that may optionally include that the single electronically steered flat-panel antenna is operable to generate the first and second beams simultaneously by beam splitting to maintain the first and second links for communication between the single electronically steered flat-panel antenna and first and second satellites at the same time.

Example 14 is the satellite communication network topology of example 13 that may optionally include that the single electronically steered flat-panel antenna is operable to: generate the first beam; route network traffic with the first hub via the first link between the antenna and the first satellite using the first beam; maintain a network connection to the second hub via the second link between the antenna and the second satellite by generating the second beam simultaneously while generating the first beam, the second hub being different than the first hub and the second beam being different than the first beam, wherein the network control is operable to determine to route the network traffic through the second hub in response to determining a disruption condition exist with respect to the first link and causes routing of the network traffic with the second hub via the second link between the antenna and the second satellite using the second beam.

Example 15 is the satellite communication network topology of example 14 that may optionally include that the disruption condition relates to a line-of-sight (LOS) disruption or another outage condition related to the first link.

Example 16 is the satellite communication network topology of example 13 that may optionally include that the single electronically steered flat-panel antenna is operable to weight the first and second beams based on one or more network functions.

Example 17 is the satellite communication network topology of example 16 that may optionally include that the single electronically steered flat-panel antenna is operable to weight the first and second beams by weighting the first beam more strongly to increase spectral efficiency while reducing weighting on the second beams to a level only sufficient to sustain a connection to the second satellite.

Example 18 is the satellite communication network topology of example 13 that may optionally include a multi-wide area network (MWAN) edge router associated with the single electronically steered flat-panel antenna; and a software-defined wide area network (SDWAN) controller, the MWAN edge router and the SDWAN controller working together to maintain a network connection on second network for protected fail over during LOS blockages or other outages on the first network.

Example 19 is the satellite communication network topology of example 12 that may optionally include that the single electronically steered flat-panel antenna is operable to generate the first and second beams one at a time, and wherein the network control manages the first and second satellite links by switching between the first and second links to communicate the network traffic between the single electronically steered flat-panel antenna and the first and second satellites while the single electronically steered flat-panel antenna toggles between use of first and second beams for the first and second satellite links.

Example 20 is the satellite communication network topology of example 19 that may optionally include that the single electronically steered flat-panel antenna is part of a satellite terminal having an edge compute appliance and a software defined modem, and further wherein the edge compute appliance is operable to direct the software defined modem to switch between the first and second links to communicate the network traffic between the single electronically steered flat-panel antenna and the first and second satellites.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A satellite communication network topology comprising:
   a single electronically steered flat-panel antenna capable of generating a plurality of beams;
   a first network comprising a first virtualized hub and a first satellite;
   a second network comprising a second virtualized hub and a second satellite;
   network control to manage first and second satellite links between the single electronically steered flat-panel antenna and the first and second satellites, respectively, to route the network traffic, wherein the network control is configured to determine when to use the first and second satellite links to first and second satellites, respectively, the first and second satellite links being generated using first and second beams of the plurality of beams from the single electronically steered flat-panel antenna; and
   a Coordinated Multi-point (CoMP) coordinator communicably coupled to the first and second virtualized hubs to coordinate routing of network traffic between the single electronically steered flat-panel antenna and the first and second satellites.

2. The satellite communication network topology of claim 1 further comprising a user terminal including a plurality of soft modems and the single electronically steered flat-panel antenna, and wherein the COMP is configured to schedule windows for data transmission across the first and second satellite links.

3. The satellite communication network topology of claim 2 wherein each of the first and second virtualized hubs indicates time slots available to the single electronically steered flat-panel antenna during which its constellation is point to the single electronically steered flat-panel antenna, and the single electronically steered flat-panel antenna uses the time slots at least send or at least receive network data with the first and second virtualized hubs and their respective constellation.

4. The satellite communication network topology of claim 1 wherein the CoMP coordinator is configured to perform load balancing with respect to the first and second satellite links to first and second satellites.

5. The satellite communication network topology of claim 4 wherein the CoMP coordinator is configured to load balance between the first and second satellite links during failovers.

6. The satellite communication network topology of claim 1 further comprising a software-defined wide area network (SDWAN) controller, and wherein the network control includes a multi-wide area network (MWAN) edge router associated with the single electronically steered flat-panel antenna, and the MWAN edge router and SDWAN controller are configured to route traffic over each of the first and second satellite links according to one or more business rules.

7. The satellite communication network topology of claim 6 wherein the MWAN edge router is part of a user terminal that includes the single electronically steered flat-panel antenna.

8. The satellite communication network topology of claim 7 wherein, according to the one or more business rules, the MWAN edge router is configured to divide outgoing traffic from the user terminal among the first and second satellite links and the SDWAN controller is configured to divide incoming traffic for the user terminal among the first and second satellite links.

9. A satellite communication network topology comprising:
   a single electronically steered flat-panel antenna capable of generating a plurality of beams;
   a first network comprising a first hub and a first satellite;
   a second network comprising a second hub and a second satellite;
   network control to manage first and second satellite links between the single electronically steered flat-panel antenna and the first and second satellites, respectively, to route the network traffic, wherein the network control is configured to determine when to use the first and second satellite links to first and second satellites, respectively, the first and second satellite links being generated using first and second beams of the plurality of beams from the single electronically steered flat-panel antenna, wherein the network control includes a multi-wide area network (MWAN) edge router associated with the single electronically steered flat-panel antenna; and
   a software-defined wide area network (SDWAN) controller, wherein the MWAN edge router and SDWAN controller are configured to route traffic over each of the first and second satellite links according to one or more business rules.

10. The satellite communication network topology of claim 9 wherein the MWAN edge router is part of a user terminal that includes the single electronically steered flat-panel antenna.

11. The satellite communication network topology of claim 10 wherein, according to the one or more business rules, the MWAN edge router is configured to divide outgoing traffic from the user terminal among the first and second satellite links and the SDWAN controller is configured to divide incoming traffic for the user terminal among the first and second satellite links.

12. The satellite communication network topology of claim 11 wherein, according to the one or more business rules, the MWAN edge router is configured to combine traffic being received by the user terminal from the first and second satellite links and the SDWAN controller is configured to combine traffic from the user terminal among the first and second satellite links that is being sent to Internet.

13. The satellite communication network topology of claim 9 wherein the MWAN edge router and the SDWAN controller working together to maintain a network connection on one or more secondary networks for protected fail over during an outage on a first network.

14. The satellite communication network topology of claim 13 wherein the outage includes a line-of-sight (LOS) blockage on the first network.

15. The satellite communication network topology of claim 9 wherein the single electronically steered flat-panel antenna is operable to generate the first and second beams simultaneously by beam splitting to maintain the first and second links for communication between the single electronically steered flat-panel antenna and first and second satellites at the same time.

16. The satellite communication network topology of claim 9 wherein the network control determines availability of a first and second networks for exchanging network traffic with the single electronically steered flat-panel antenna.

17. A method for controlling communication in a satellite communication network having multiple constellations and a satellite terminal with a single electronically steered flat-panel antenna capable of generating a plurality of beams for communication links with multiple satellites, the method comprising:
   determining, under network control, availability of a plurality of networks by which network traffic may be exchanged with the single electronically steered flat-panel antenna; and
   managing, under network control, two or more satellite links between the single electronically steered flat-panel antenna and two or more satellites of different networks to route the network traffic, including determining when to use each of the two or more satellite links, the two or more satellite links being generated using two or more beams from the single electronically steered flat-panel antenna, wherein using two or more beams comprises
      generating the two or more beams simultaneously by performing beam splitting to maintain the two or more links for communication between the single electronically steered flat-panel antenna and two or more different satellites at the same time, and
      performing fast switching by the single electronically steered flat-panel antenna by repointing the single electronically steered flat-panel antenna from one of the two or more different satellites to another of the two or more different satellites when data is available.

18. The method of claim 17 wherein the single electronically steered flat-panel antenna performs beam splitting as part of receive operations when receiving data via the two or more satellite links.

19. The method of claim 18 wherein the single electronically steered flat-panel antenna performs fast switching as part of transmit operations when transmitting data via the two or more satellite links.

20. The method of claim 17 further comprising, when beam splitting:
   generating a first beam with a single electronically steered flat-panel antenna;
   routing network traffic with the first hub via a first link between the antenna and a first satellite using the first beam;
   maintaining a network connection to a second hub via a second link between the antenna and a second satellite by generating a second beam with the single electronically steered flat-panel antenna simultaneously while generating the first beam, the second hub being different than the first hub and the second beam being different than the first beam;
   determining, by the network control, to route the network traffic through the second hub in response to determining a disruption condition exists with respect to the first link; and
   routing the network traffic with the second hub via the second link between the antenna and the second satellite using the second beam.

21. The method of claim 20 wherein the disruption condition relates to a line-of-sight (LOS) disruption or another outage condition related to the first link.

22. The method of claim 20 further comprising weighting each of the two or more beams based on one or more network functions.

* * * * *